(12) United States Patent
Maass et al.

(10) Patent No.: US 9,419,290 B2
(45) Date of Patent: Aug. 16, 2016

(54) FUEL CELL AND METHOD FOR SEALING A COOLANT CHAMBER OF A BIPOLAR PLATE OF A FUEL CELL

(71) Applicant: Robert Bosch GmbH, Stuttgart (DE)

(72) Inventors: Sebastian Maass, Renningen-Malmsheim (DE); Markus Ketterer, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 14/091,029

(22) Filed: Nov. 26, 2013

(65) Prior Publication Data

US 2014/0147762 A1   May 29, 2014

(30) Foreign Application Priority Data

Nov. 28, 2012 (DE) .......................... 10 2012 221 730

(51) Int. Cl.
*H01M 8/02* (2016.01)
*H01M 8/24* (2016.01)
*H01M 8/10* (2016.01)

(52) U.S. Cl.
CPC .......... *H01M 8/0267* (2013.01); *H01M 8/0273* (2013.01); *H01M 8/0286* (2013.01); *H01M 2008/1095* (2013.01); *Y02E 60/50* (2013.01)

(58) Field of Classification Search
CPC   H01M 8/0267; H01M 8/0273; H01M 8/0286
USPC .................................................. 429/434, 535
See application file for complete search history.

(56) References Cited

U.S. PATENT DOCUMENTS

2012/0251918 A1* 10/2012 Morimoto ........... H01M 8/0254
429/482

FOREIGN PATENT DOCUMENTS

| DE | 19908555 | | 9/2000 | |
|---|---|---|---|---|
| DE | 102006056468 | | 7/2007 | |
| JP | 2004207074 A | * | 7/2004 | |
| WO | WO 2011013313 A1 | * | 2/2011 | .......... H01M 8/0254 |

OTHER PUBLICATIONS

Tanaka, H., Machine translation of JP 2004-207074 A, Jul. 2004.*

* cited by examiner

*Primary Examiner* — Sean P Cullen
(74) *Attorney, Agent, or Firm* — Michael Best & Friedrich LLP

(57) ABSTRACT

A method for sealing a coolant chamber (5) of a bipolar plate (1) of a fuel cell (20), the fuel cell (20) having at least one membrane-electrode unit (21) and the bipolar plate (1) having a first bipolar plate half (2) and a second bipolar plate half (3), at least one of the bipolar plate halves (2, 3) having a coolant distributing structure (4) and the coolant chamber (5) that is formed at least by the coolant distributing structure (4) being formed between the bipolar plate halves (2, 3).

10 Claims, 4 Drawing Sheets a)

b)

c)

d)

FUEL CELL AND METHOD FOR SEALING A COOLANT CHAMBER OF A BIPOLAR PLATE OF A FUEL CELL

BACKGROUND OF THE INVENTION

The present invention relates to a method for sealing a coolant chamber of a bipolar plate of a fuel cell, the fuel cell having at least one membrane-electrode unit and the bipolar plate having a first bipolar plate half and a second bipolar plate half, at least one of the bipolar plate halves having a coolant distributing structure and the coolant chamber that is formed at least by the coolant distributing structure being formed between the bipolar plate halves. The invention also relates to a fuel cell with at least one bipolar plate and at least one membrane-electrode unit, the bipolar plate having a first bipolar plate half and a second bipolar plate half, at least one of the bipolar plate halves having a coolant distributing structure and a coolant chamber that is formed at least by the coolant distributing structure being formed between the bipolar plate halves, and the at least one bipolar plate being arranged in a flat-extending manner against the membrane-electrode unit to form a gas chamber of an anode or a cathode of the fuel cell between the bipolar plate and the membrane-electrode unit.

Fuel cells may have multiple bipolar plates and membrane-electrode units. In the production of bipolar plates, it is also known that these bipolar plates may in each case have two bipolar plate halves. It is at the same time also possible in particular that one bipolar plate half on one side of the plate may have a gas distributing structure, for example for hydrogen in the case of an anode of the fuel cell or for air in the case of a cathode of the fuel cell, and the other side of the plate may have a coolant distributing structure for the distribution of a coolant. It is known to permanently connect the two bipolar plate halves in in the form of a point or points, a line or lines and/or flat over part of their extent by adhesive bonding, welding, soldering or brazing or similar connecting processes. It is also known to arrange a seal at the outer region of such a bipolar plate. Both possibilities are motivated by preventing coolant from escaping from the coolant chamber that is formed between the two bipolar plate halves.

In addition, it is known likewise to arrange seals between a bipolar plates and a membrane-electrode units of a fuel cell. Such seals or sealing arrangements are known for example from DE 10 2006 056 468 A1 or DE 199 08 555 A1. These seals are used for ensuring that the gases used in the fuel cell, in particular hydrogen and air, likewise cannot escape undesirably from the fuel cell.

However, a disadvantage here is that, in addition to the sealing of the gas chambers, either a separate sealing of the coolant chamber or a coolant-tight, permanent connection of the bipolar plate halves is necessary. Both variants are cost-intensive and require increased expenditure in terms of both material and time in the production and/or assembly of such a fuel cell.

SUMMARY OF THE INVENTION

It is therefore an object of the present invention to eliminate at least partially the disadvantages described above of known methods for sealing a coolant chamber of a bipolar plate and of known fuel cells. In particular, it is an object of the present invention to provide a method for sealing a coolant chamber and a fuel cell that make it possible in a simple and low-cost way to produce a fuel cell and a sealed coolant chamber, the expenditure of time and material during production being reduced in particular.

The aforementioned object is achieved by a method for sealing a coolant chamber according to the invention and by a fuel cell according to the invention. Further features and details of the invention are provided by the dependent claims, the description and the drawings. Features and details that are described in connection with the method according to the invention also apply here of course in connection with the fuel cell according to the invention and vice versa, so that, with respect to the disclosure of the individual aspects of the invention, reference is or can be made always to one or the other respectively.

In a first aspect of the invention, the object is achieved by a method for sealing a coolant chamber of a bipolar plate of a fuel cell, the fuel cell having at least one membrane-electrode unit and the bipolar plate having a first bipolar plate half and a second bipolar plate half, at least one of the bipolar plate halves having a coolant distributing structure and the coolant chamber that is formed at least by the coolant distributing structure being formed between the bipolar plate halves. In particular, a method according to the invention is characterized by the following steps:
  a) arranging the bipolar plate in a flat-extending manner against the at least one membrane-electrode unit,
  b) forming a gas chamber of an anode or a cathode of the fuel cell between the bipolar plate and the membrane-electrode unit,
  c) arranging a seal for sealing the gas chamber in such a way that the coolant chamber is also sealed by the seal, both bipolar plate halves of the bipolar plate being contacted by the seal.

During operation of the fuel cell, the coolant chamber is flowed through by a cooling fluid for cooling the fuel cell. The coolant distributing structure that at least one of the bipolar plate halves, preferably both bipolar plate halves, has or have achieves the effect of ensuring an optimum distribution of the cooling fluid within the coolant chamber, whereby reliable and efficient cooling of the fuel cell can be achieved. The coolant distributing structure may in this case also comprise and/or be formed from a material, in particular a porous material, that is arranged between the bipolar plate halves. Furthermore, the coolant distributing structure may be formed as a spacer for fixing the spacing of the two bipolar plates from one another. For the purposes of the invention, flat-extending means in particular that the extent of the bipolar plate and of the membrane-electrode unit is much greater in two spatial dimensions than in the third dimension, arrangement in a flat-extending manner meaning arrangement of the two components against one another in such a way that as large a contact area as possible is achieved between the bipolar plate and the membrane-electrode unit. In addition to the coolant distributing structure, a bipolar plate may also have a gas distributing structure, by which a gas stream in the gas chamber, in particular a stream of hydrogen or air, can be optimally distributed and conducted. In particular, a bipolar plate may also be formed in such a way that the at least one coolant distributing structure forms at least part of the gas distributing structure on the other side of the bipolar plate half A decisive factor for reliable operation of a fuel cell is that both the coolant chamber and the gas chamber are sealed. The two chambers must in this case be respectively sealed separately in themselves but also with respect to one another. The coolant chamber in a bipolar plate is located between the two bipolar plate halves. According to the invention, a seal for sealing the gas chamber is arranged in such a way that on the one hand the gas chamber is sealed. On the other hand, in addition, both bipolar plate halves of the bipolar plate are contacted by the seal. The seal consequently contacts both the membrane-electrode unit and both bipolar plate halves of the bipolar plate. The contacting of the two bipolar plate halves thereby also has the effect that the coolant chamber that is formed between the bipolar plate halves is sealed. As a result, it is possible to seal both the gas chamber and the coolant chamber respectively separately and also with respect to one another at the same time, i.e. by the same seal. The provision of only a single seal means that this represents a particularly simple way of sealing both the gas chamber and the coolant chamber. As a result, not only costs but also material and time can be saved in production. It also dispenses with the imperative requirement for a bipolar plate that the two bipolar plate halves must be permanently and tightly connected to one another already before the assembly of the fuel cell. Also as a result of this, production time can be saved in the production of a fuel cell.

In addition, in the case of a method according to the invention for sealing a coolant chamber, it may be provided that the seal is arranged on the membrane-electrode unit. The arrangement of the seal on the membrane-electrode unit may in this case take place both in the before the assembly of the fuel cell and after the arrangement of the bipolar plate in a flat-extending manner against the membrane-electrode unit. In particular, the bipolar plate may be pressed into the seal arranged on the membrane-electrode unit during assembly. Particularly good holding of the seal on the membrane-electrode unit can likewise be ensured by the direct arrangement of the seal on the membrane-electrode unit.

Alternatively, in the case of a method according to the invention for sealing a coolant chamber, it may be provided that the seal is arranged on the bipolar plate. As a result, a connection of the two bipolar plate halves is also possible in particular. This may likewise already take place in advance of the assembly of the fuel cell. The bipolar plate is thereby connected by the seal as a unit of the two bipolar plate halves. Particularly good sealing of the coolant chamber can be achieved in this way.

Furthermore, in the case of a method according to the invention for sealing a coolant chamber, it may be provided that the seal is molded on and adhesively attached. Molding on of the seal, both onto the membrane-electrode unit and onto the two bipolar plate halves of the bipolar plate, or else onto both components, represents a method of arranging the seal that allows particularly variable forms. The seal can in this way also penetrate into particularly small intermediate spaces between the bipolar plate and the membrane-electrode unit and also ensure sealing of the coolant chamber and/or the gas chamber there. Adhesive attachment of the seal, which may constitute both adhesive attachment on the membrane-electrode unit and adhesive attachment on the two bipolar plate halves of the bipolar plate or else adhesive attachment on both components, makes it possible in particular to produce a fuel cell in which the individual components of the fuel cell are held particularly securely with respect to one another.

In a second aspect of the invention, the object is achieved by a fuel cell with at least one bipolar plate and at least one membrane-electrode unit, the bipolar plate having a first bipolar plate half and a second bipolar plate half, at least one of the bipolar plate halves having a coolant distributing structure and a coolant chamber that is formed at least by the coolant distributing structure being formed between the bipolar plate halves, and the at least one bipolar plate being arranged in a flat-extending manner against the membrane-electrode unit to form a gas chamber of an anode or a cathode of the fuel cell between the bipolar plate and the membrane-electrode unit. In particular, the fuel cell according to the invention is characterized in that the fuel cell has a seal for sealing the gas chamber and contacting of the two bipolar plate halves by the seal has the effect that the coolant chamber can also be sealed.

A fuel cell according to the invention may in particular also have multiple membrane-electrode units and multiple bipolar plates, which in this case are particularly preferably arranged in relation to one another as an alternating stack. During operation of the fuel cell, the coolant chamber of the bipolar plate is flowed through by a cooling fluid for cooling the fuel cell. An optimized distribution of the cooling fluid in the coolant chamber, and consequently particularly efficient cooling of the fuel cell, can be achieved by the coolant distributing structure that at least one of the bipolar plate halves has. The bipolar plate and the membrane-electrode unit have in particular a flat-extending form, it being possible when the two components of the fuel cell are being arranged against one another for the bipolar plate and the membrane-electrode unit to be arranged against one another in such a way that they preferably have a common contact area that is as large as possible. In this case, it may also be provided in particular that the bipolar plate also has a gas distributing structure, which is in particular arranged in the gas chamber that is formed between the bipolar plate and the membrane-electrode unit. It may be provided with particular preference in this case that the coolant distributing structure of a bipolar plate half at least partially forms this gas distributing structure on the other side of the bipolar plate half, which then forms the outer side of the bipolar plate. Consequently, the gas chamber is formed between the membrane-electrode unit and the bipolar plate, the coolant chamber is formed between the two bipolar plate halves. For reliable operation of the fuel cell, it is necessary that both the gas chamber and the coolant chamber are respectively sealed separately and with respect to one another. According to the invention, a seal which on the one hand is intended for sealing the gas chamber and at the same time seals the coolant chamber is provided. This is ensured in particular by the seal contacting both bipolar plate halves of the bipolar plate. In this way it is possible to reliably seal the coolant chamber that is formed between the two bipolar plate halves. Furthermore, the seal is intended for sealing the gas chamber. This dual function of the seal, the sealing of the gas chamber and the sealing of the coolant chamber, means that a particularly simple construction of the fuel cell is made possible. In particular, both the gas chamber and the coolant chamber can in this way be sealed by just one seal. Consequently, on the basis of the present invention, further seals for the sealing of the gas chamber and/or the coolant chamber can be avoided. In addition, in this way particularly reliable sealing can be achieved. As a result, a saving of material and time in the production of the fuel cell, and correspondingly also a reduction of the costs in the production of the fuel cell, are made possible. As a result, separate sealing of the coolant chamber between the two bipolar plate halves, and in particular permanent connection of the two bipolar plate halves by welding, adhesive bonding or similar production steps, are no longer imperative.

Furthermore, in the case of a fuel cell according to the invention, it may be provided that the seal for contacting the bipolar plate halves is formed in a peripheral region of the bipolar plate. It is in particular preferred in this case that the peripheral region of the bipolar plate also forms the peripheral region of the two bipolar plate halves. Consequently, in the peripheral region, these bipolar plate halves lie in particular flush on top of one another or flush against one another. As a result, when arranging the seal, both bipolar plate halves can in particular be easily contacted. In particular, the seal can also penetrate into the intermediate space between the bipolar plates. As a result, particularly good sealing of the coolant chamber between the two bipolar plate halves can be achieved. It is also conceivable that the seal may be arranged on both flat-extending outer sides of the bipolar plate. This is of advantage in particular for a fuel cell that is formed as a stack of membrane-electrode units and bipolar plates, since as a result a coolant chamber and two gas chambers, on both sides of the bipolar plate, can be sealed by a single seal.

In addition, it may in particular be preferred in the case of a fuel cell according to the invention that it is provided that the seal is a substantially encircling seal with respect to the membrane-electrode unit and/or with respect to the bipolar plate. A substantially encircling seal allows a particularly large coolant chamber to be formed between the bipolar plate halves and a particularly large gas chamber to be formed between the bipolar plate and the membrane-electrode unit. In this case, the coolant chamber and the gas chamber are in particular bounded substantially only by the flat-extending extent of the bipolar plate and the membrane-electrode unit. As a result, particularly efficient use of space of a fuel cell can be achieved.

A fuel cell according to the invention may also be designed such that at least one of the bipolar plate halves has a bent-up portion in the region of the contacting by the seal. As a result, this at least one bipolar plate half protrudes at least a little into the seal. A particularly good connection of the bipolar plate half to the seal can be achieved in this way. As a result, the sealing of the coolant chamber can be further improved. It may be provided with particular preference in this case that both bipolar plate halves respectively have a bent-up portion in the region of the contacting by the seal. In this way, the sealing effect of the seal with respect to the coolant chamber can be further improved.

Furthermore, in the case of a fuel cell according to the invention, it may be provided that the bipolar plate has at least one through-opening, the seal passing through the at least one through-opening and allowing itself to be arranged on both sides of the bipolar plate during the arrangement, in particular molding-on, of the seal. In this way it is possible to arrange a seal on both sides of the bipolar plate in a single production step. This represents a great time saving in the production of a fuel cell according to the invention. In addition, a connection of the two bipolar plate halves can be additionally achieved by a seal that passes through the through-opening and at the same time, i.e. in a single method step, allows itself to be arranged on both sides of the bipolar plate. Particular stability of a fuel cell according to the invention can likewise be achieved in this way.

It may be provided with particular preference in the case of a fuel cell according to the invention that the coolant chamber of the at least one bipolar plate of the fuel cell is sealed by a method according to the first aspect of the invention. All of the advantages that have been described with respect to a method according to the invention as provided by the first aspect of the invention consequently also apply of course to a fuel cell according to the invention of which the coolant chamber has been sealed by such a method.

BRIEF DESCRIPTION OF THE DRAWINGS

The method according to the invention and developments thereof as well as their advantages and also the fuel cell according to the invention and developments thereof as well as their advantages are explained in more detail below on the basis of drawings, in which schematically.

DETAILED DESCRIPTION

Figure 1:
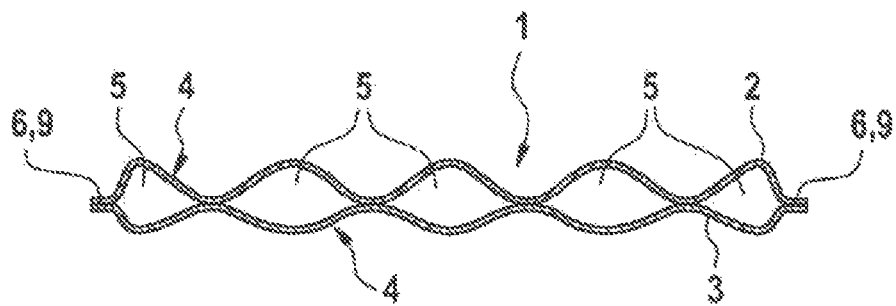
FIG. 1 shows a bipolar plate according to the prior art.
Figure 2:
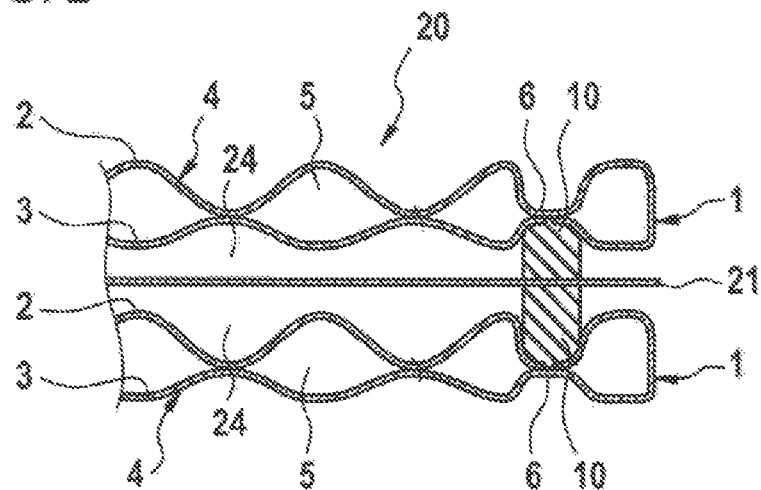
FIG. 2 shows a possible embodiment of a fuel cell according to the invention.
Figure 3:
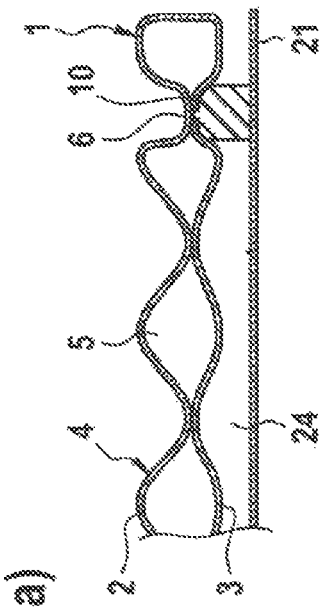
FIGS. 3a)-d) show possible embodiments of a fuel cell according to the invention, FIGS. 4a)-d) show possible embodiments of the peripheral region of a bipolar plate
Figure 3:
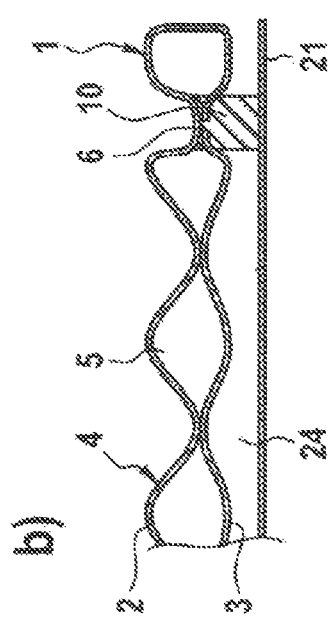
Figure 3:
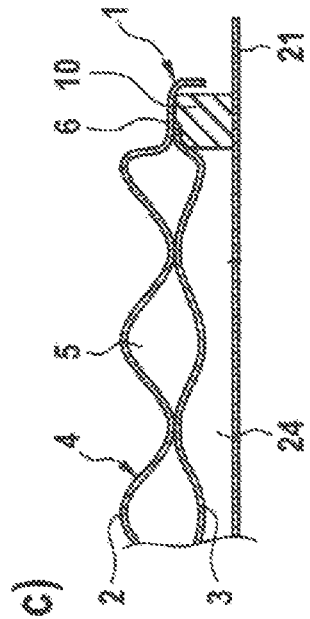
Figure 3:
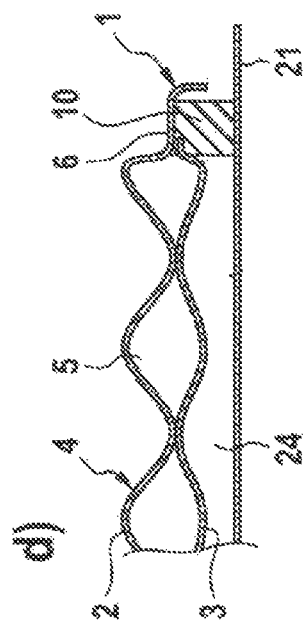

Elements with the same function and operating mode are respectively provided with the same reference numerals in FIGS. 1, 2, 3a) to d), 4a) to d) and 5.

FIG. 1 shows a bipolar plate 1, the coolant chamber 5 of which is sealed according to the prior art. For this, the first bipolar plate half 2 and the second bipolar plate half 3 are connected to one another in the peripheral region 6 of the bipolar plate 1 by a continuous connection 9. Such a continuous connection 9 may be for example a laser welding, an adhesive bonding or a soldering or brazing. The coolant chamber 5, which is formed in particular by a coolant distributing structure 4 of the first bipolar plate half 2 and the second bipolar plate half 3, is thereby sealed. A disadvantage in this case is that this sealing constitutes a production step of its own, which on the one hand means greater expenditure of material and on the other hand means in particular greater expenditure of time.

In FIG. 2 there is shown a fuel cell 20, which has two bipolar plates 1 and a membrane-electrode unit 21. The two bipolar plates 1 respectively have a first innermost or outermost bipolar plate half 2 and a second innermost or outermost bipolar plate half 3. In both bipolar plates 1, a coolant chamber 5 is formed in each case between the respective bipolar plate halves 2, 3. In particular, all the bipolar plate halves 2, 3 of the two bipolar plates 1 also respectively have a coolant distributing structure 4, by which the coolant chamber 5 of the two bipolar plates 1 is structured. Such a coolant distributing structure 4 allows an optimum distribution of the coolant in the coolant chamber 5, and consequently ensures particularly efficient cooling of the fuel cell 20. Between the two bipolar plates 1 and the membrane-electrode unit 21, a gas chamber 24 is respectively formed. On different sides of the membrane-electrode unit 21, this represents firstly the gas chamber 24 of an anode 22 or of a cathode 23. In the embodiment shown of the fuel cell 20 according to the invention, the bipolar plate half 2 or 3 facing the membrane-electrode unit 21 is respectively provided here with such a coolant distributing structure 4 that this coolant distributing structure 4 also forms a gas distributing structure for the respective gas chamber 24. In the case of the fuel cell 20 according to the invention, furthermore, a seal 10 is respectively arranged in a peripheral region 6 of the two bipolar plates 1. In this embodiment of a fuel cell 20 according to the invention, the seal 10 is arranged directly on the membrane-electrode unit 21. It is located between the membrane-electrode unit 21 and the bipolar plate 1 respectively arranged in a flat-extending manner against it. It is essential for the invention in this respect that the respective seal 10 also contacts both bipolar plate halves 2, 3 of the bipolar plate 1 in the peripheral region 6 of the bipolar plate 1. In this way it can be ensured that the coolant chamber 5, which is bounded and formed by the two bipolar plate halves 2, 3, is also reliably sealed by the seal 10. In this way it is possible to seal both the gas chamber 24 and the coolant chamber 5 with only one seal 10. This represents a clear simplification, since only a single seal 10 is required. Separate sealing of the coolant chamber 5, whether by a continuous connection 9 or by a separate seal of the coolant chamber 5, is not necessary. As a result, both material and production time can be saved in the production of a fuel cell 20 according to the invention, and as a result production costs can also be saved.

FIGS. 3a) to d) show possible arrangement variants of a seal 10 of a fuel cell 20 according to the invention. Only one bipolar plate 1 and a membrane-electrode unit 21 on which said plate is arranged in a flat-extending manner are shown in each case. Between the bipolar plate 1 and the membrane-electrode unit 21, the gas chamber 24 of an anode is respectively formed. Between the bipolar plate halves 2, 3, a coolant chamber 5 is formed. The respective bipolar plate halves 2, 3 also respectively have a coolant distributing structure 4, which structures the coolant chamber 5 and thus makes particularly good cooling of the fuel cell 20 possible during operation of the fuel cell 20. In FIGS. 3a) and c), the seal 10 is arranged directly on the membrane-electrode unit 21. The difference in the two figures is that, in FIG. 3a), the peripheral region 6 of the bipolar plate 1 is designed in such a way that a guiding groove for the seal 10 is formed. This guiding groove allows reliable placement of the seal 10 to be assisted. However, such a guiding groove is not imperative, as can be seen for example in FIG. 3c). It can be clearly seen in both figures, however, that the seal 10 contacts both bipolar plate halves 2, 3 of the bipolar plate 1. By contrast with this, in FIGS. 3b) and d) the seal 10 is molded directly on the bipolar plate 1. As a result, particularly effective penetration of the sealing compound of the seal 10 between the two bipolar plate halves 2, 3 can be achieved. As a result, in addition to the sealing of the coolant chamber 5, holding together of the two bipolar plate halves 2, 3 can be achieved. In turn, the embodiment with a guiding groove in the bipolar plate 1 for the seal 10 is shown in FIG. 3b) and without such a guiding groove in the bipolar plate 1 is shown in FIG. 3d).

Figure 4:
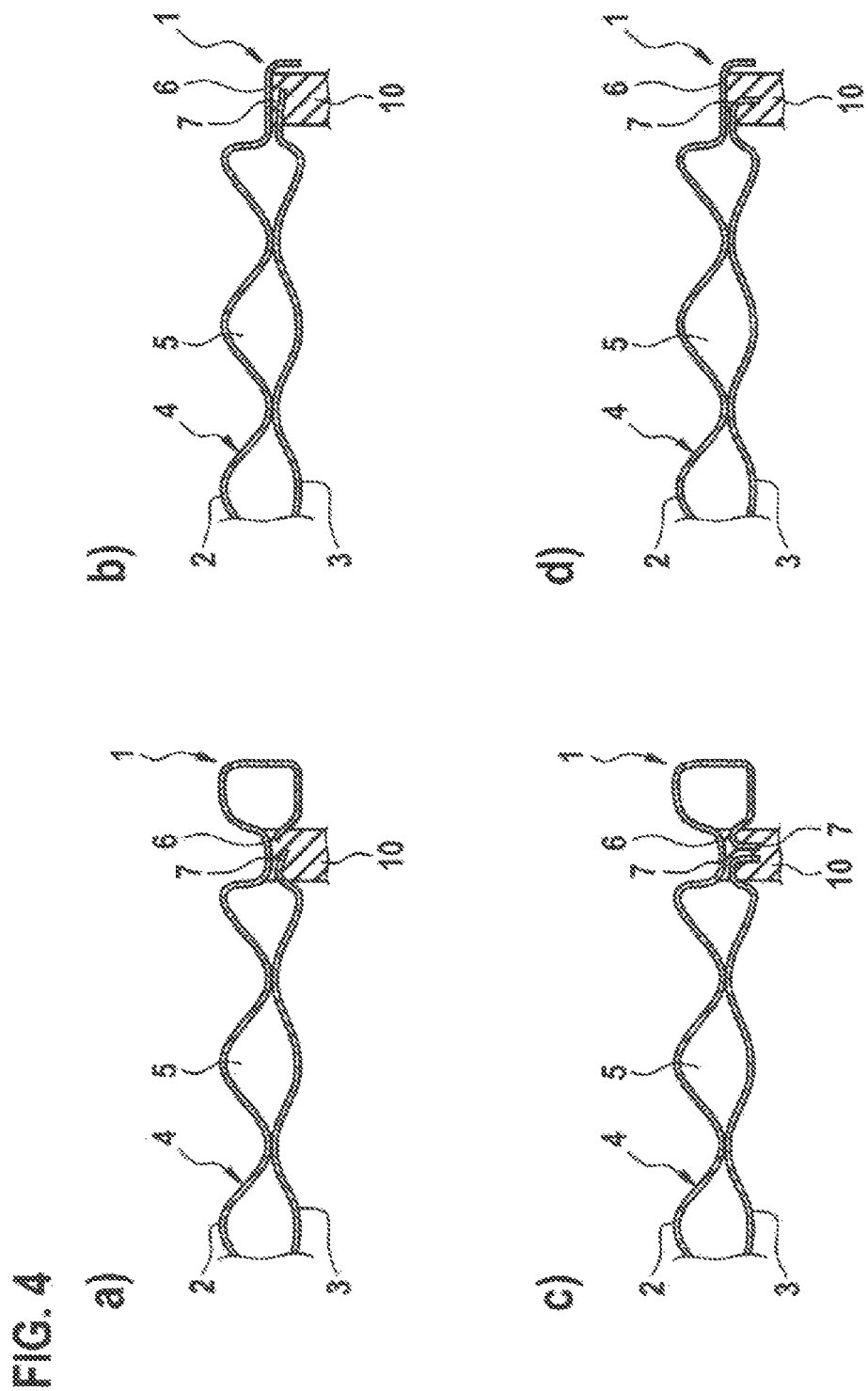

FIGS. 4a) to d) respectively show a bipolar plate 1, consisting of two bipolar plate halves 2, 3, the ends of which have in the peripheral region 6 of the bipolar plate varyingly bent-up portions 7. Depending on the degree to which the bent-up portion 7 is bent up, it is possible particularly well for the sealing compound of the seal 10 to flow behind or penetrate between the two bipolar plate halves 2, 3. In particular in FIGS. 4c) and d), in which a particularly clear bent-up portion 7 can be seen, this penetration and backfilling of the intermediate space between the two bipolar plate halves 2, 3 by the sealing compound of the seal 10 is particularly clear. In FIG. 4c) there is also shown a bent-up portion 7 in the case of both bipolar plate halves 2, 3, so that as a result particularly reliable holding of the two bipolar plate halves 2, 3 in relation to one another can be ensured.

Figure 5:
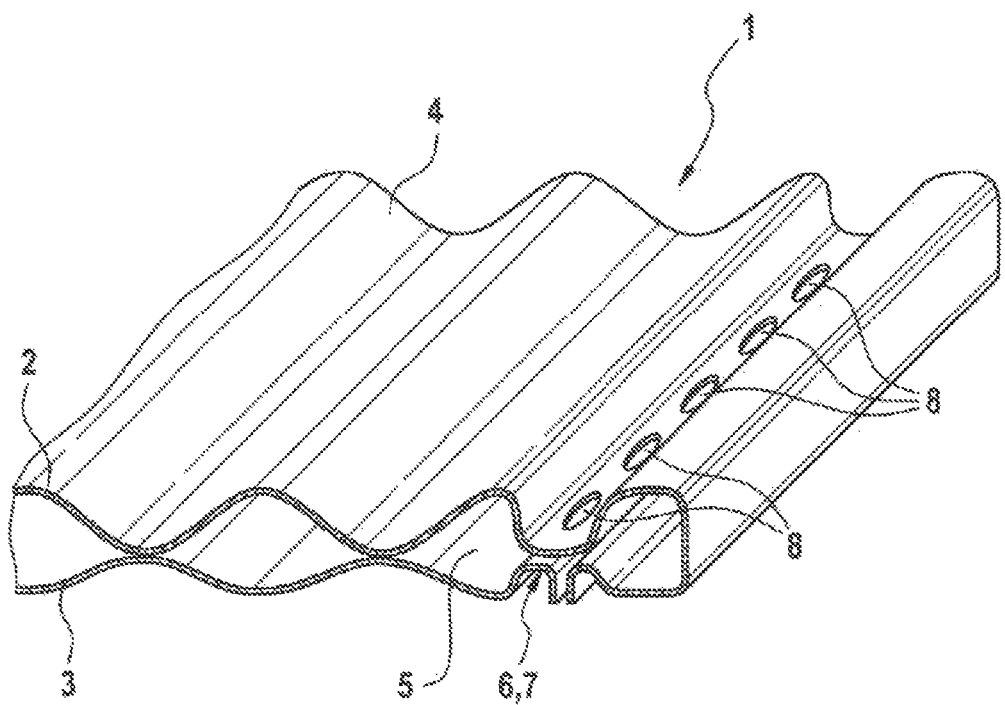
FIG. 5 shows a possible embodiment of a bipolar plate.

In FIG. 5, a further embodiment of a bipolar plate 1 for a fuel cell 20 according to the invention is shown. Between the bipolar plate halves 2, 3, in turn a coolant chamber 5 that is formed by a coolant distributing structure 4 can be seen. In particular, both bipolar plate halves 2, 3 also have bent-up portions 7 in the peripheral region 6 of the bipolar plate 1. Particularly on this embodiment of the bipolar plate 1, there are in particular the through-openings 8, which are likewise arranged at the peripheral region 6 of the bipolar plate 1. As a result, when arranging, in particular molding-on, a seal 10 (not depicted) in the peripheral region 6 of the bipolar plate 1, the sealing compound of the seal 10 can pass through the through-openings 8 and thus be arranged on both sides of the bipolar plate 1 in one production step. As a result, consequently, on the one hand a production step can be saved in the production of a fuel cell 20 according to the invention. On the other hand, particularly reliable holding together of the two bipolar plate halves 2, 3 can be achieved to form the bipolar plate 1.

What is claimed is:

1. A method for sealing a coolant chamber (5) of a bipolar plate (1) of a fuel cell (20), the fuel cell (20) having at least one membrane-electrode unit (21) and the bipolar plate (1) including an innermost bipolar plate half (2, 3) arranged closest to the at least one membrane-electrode unit (21) and an outermost bipolar plate half (2, 3) arranged farthest from the at least one membrane-electrode unit (21), at least one of the innermost and outermost bipolar plate halves (2, 3) having a coolant distributing structure (4) and the coolant chamber (5) that is formed at least by the coolant distributing structure (4) being formed between the innermost and outermost bipolar plate halves (2, 3), and the outermost bipolar plate half (2, 3) bending approximately 180 degrees first towards the at least one membrane-electrode unit (21) and then back towards the innermost bipolar plate half (2, 3) so as to overlap with a portion of the outermost bipolar plate half and to create a space between ends of the innermost and outermost bipolar plate halves (2, 3), the method comprising:
   a) arranging the bipolar plate (1) in a flat-extending manner against the at least one membrane-electrode unit (21),
   b) forming one of an anode gas chamber (24) and a cathode gas chamber (24) of the fuel cell (20) between the bipolar plate (1) and the at least one membrane-electrode unit (21), and
   c) arranging a seal (10) such that the seal (10) seals against the at least one membrane-electrode unit (21), extends through the space to contact the ends of the innermost and outermost bipolar plate halves and an inner surface of the outermost bipolar plate half (2, 3), thereby sealing the coolant chamber (5), and thereby sealing the one of the anode gas chamber (24) and the cathode gas chamber (24).

2. The method for sealing a coolant chamber (5) according to claim 1, characterized in that the seal (10) is arranged directly on the membrane-electrode unit (21).

3. The method for sealing a coolant chamber (5) according to claim 1, characterized in that the seal (10) is molded on or adhesively attached.

4. A fuel cell (20) comprising:
   at least one membrane-electrode unit (21);
   a bipolar plate (1) including an innermost bipolar plate half (2, 3) arranged closest to the at least one membrane-electrode unit (21) and an outermost bipolar plate half (2, 3) arranged farthest from the at least one membrane-electrode unit (21), at least one of the innermost and outermost bipolar plate halves (2, 3) having a coolant distributing structure (4) and a coolant chamber (5) that is formed at least by the coolant distributing structure (4) being formed between the innermost and outermost bipolar plate halves (2, 3), the bipolar plate (1) being arranged in a flat-extending manner against the at least one membrane-electrode unit (21) to form one of an anode gas chamber (24) or a cathode gas chamber (24) of the fuel cell (20) between the bipolar plate (1) and the at least one membrane-electrode unit (21), and the outermost bipolar plate half (2, 3) bending approximately 180 degrees first towards the at least one membrane-electrode unit (21) and then back towards the innermost bipolar plate half (2, 3) so as to overlap with a portion of the outermost bipolar plate half and to create a space between ends of the innermost and outermost bipolar plate halves (2, 3); and a seal (10) arranged on the at least one membrane-electrode unit (21) such that the seal (10) seals against the at least one membrane-electrode unit (21) and extends through the space to contact the ends of the innermost and outermost bipolar plate halves and an inner surface of the outermost bipolar plate half (2, 3), thereby sealing the coolant chamber (5), and thereby sealing the one of the anode gas chamber (24) and the cathode gas chamber (24).

5. The fuel cell (20) according to claim 4, characterized in that the seal (10) for contacting the bipolar plate halves (2, 3) is formed in a peripheral region (6) of the bipolar plate (1).

6. The fuel cell (20) according to claim 4, characterized in that the seal (10) is a substantially encircling seal (10) with respect to at least one of the membrane-electrode unit (21) and the bipolar plate (1).

7. The fuel cell (20) according to claim 4, characterized in that at least one of the innermost and outermost bipolar plate halves (2, 3) has a bent-up portion (7) in a region of contacting by the seal (10).

8. The fuel cell (20) according to claim 4, characterized in that the bipolar plate (1) has at least one through-opening (8), the seal (10) being configured to pass through the at least one through-opening (8) and to allow itself to be arranged on multiple sides of the bipolar plate (1) during arrangement of the seal (10).

9. A fuel cell (20) comprising:
a membrane-electrode unit (21) having a first side and a second side opposite the first side;
a first bipolar plate (1) arranged on the first side of the membrane-electrode unit and a second bipolar plate (1) arranged on the second side of the membrane-electrode unit, each of the first and second bipolar plates (1) including
an outermost bipolar plate half (2) and an innermost bipolar plate half (3), at least one of the outermost and innermost bipolar plate halves (2, 3) having a coolant distributing structure (4) and a coolant chamber (5) that is formed at least by the coolant distributing structure (4) being formed between the outermost and innermost bipolar plate halves (2, 3), and the outermost bipolar plate half (2, 3) bending approximately 180 degrees first towards the membrane-electrode unit (21) and then back towards the innermost bipolar plate half (2, 3) so as to overlap with a portion of the outermost bipolar plate half and to create a space between ends of the outermost and innermost bipolar plate halves (2, 3);
an anode gas chamber (24) defined between the first bipolar plate (1) and the membrane-electrode unit (21);
a cathode gas chamber (24) defined between the second bipolar plate (1) and the membrane-electrode unit (21); and
a seal (10) arranged on the membrane-electrode unit (21),
the seal (10) being arranged on the membrane-electrode unit (21) such that the seal (10) seals against the first side of the membrane-electrode unit (21) and extends through the space to contact the ends of the innermost and outermost bipolar plate halves of the first bipolar plate (1) and an inner surface of the outermost bipolar plate half of the first bipolar plate (1), thereby sealing the respective coolant chamber (5), and thereby sealing the anode gas chamber (24), and
the seal (10) being arranged on the membrane-electrode unit (21) such that the seal (1) seals against the second side of the membrane-electrode unit (21) and extends through the space to contact the ends of the innermost and outermost bipolar plate halves of the second bipolar plate (1) and an inner surface of the outermost bipolar plate half of the second bipolar plate (1), thereby sealing the respective coolant chamber (5), and thereby sealing the cathode gas chamber (24).

10. The fuel cell (20) according to claim 9, characterized in that the bipolar plate (1) has at least one through-opening (8), the seal (10) configured to pass through the at least one through-opening (8) and to allow itself to be arranged on multiple sides of the bipolar plate (1) during molding-on of the seal (10).

* * * * *